United States Patent [19]
Cheng et al.

[11] Patent Number: 6,101,624
[45] Date of Patent: Aug. 8, 2000

[54] METHOD AND APPARATUS FOR DETECTING AND CORRECTING ANOMALIES IN FIELD-PROGRAMMABLE GATE ARRAYS USING CRCS FOR ANOMALY DETECTION AND PARITY FOR ANOMALY CORRECTION

[75] Inventors: Joe-Ming Cheng, Cupertino; Shanker Singh, Morgan Hill, both of Calif.

[73] Assignee: International Business Machines Corporation, Armonk, N.Y.

[21] Appl. No.: 09/119,705

[22] Filed: Jul. 20, 1998

Related U.S. Application Data

[63] Continuation-in-part of application No. 09/010,726, Jan. 21, 1998.

[51] Int. Cl.[7] .................................................. G06F 11/00
[52] U.S. Cl. .......................... 714/736; 714/752; 714/48; 714/758
[58] Field of Search .................................. 714/736, 724, 714/758, 752, 746, 48

[56] References Cited

U.S. PATENT DOCUMENTS

| | | | |
|---|---|---|---|
| 3,976,982 | 8/1976 | Eiselen | 382/284 |
| 4,092,732 | 5/1978 | Ouchi | 395/182.03 |
| 4,761,785 | 8/1988 | Clark et al. | 371/51.1 |
| 5,744,979 | 4/1998 | Goetting | 326/39 |
| 5,959,987 | 9/1999 | Humphrey et al. | 370/352 |
| 5,991,270 | 11/1999 | Zwan et al. | 370/249 |

*Primary Examiner*—Phung M. Chung
*Attorney, Agent, or Firm*—R. Bruce Brodie

[57] ABSTRACT

A method and means for detecting and correcting anomalies in a RAM-based FPGA by comparing CRC residues over portions of the RAM-stored connection bitmap with pre-stored residues derived from uncorrupted copies of the same bitmap portions. A mismatch selectively invokes either error reporting to the chip only, error reporting and immediate verification testing of counterpart FPGA chip functions, or error reporting, parity-based correction of the words in error, reprogramming of the chip functions with the corrected words, and verification testing.

13 Claims, 4 Drawing Sheets

FPGA Modified to Incorporate RAM Testing

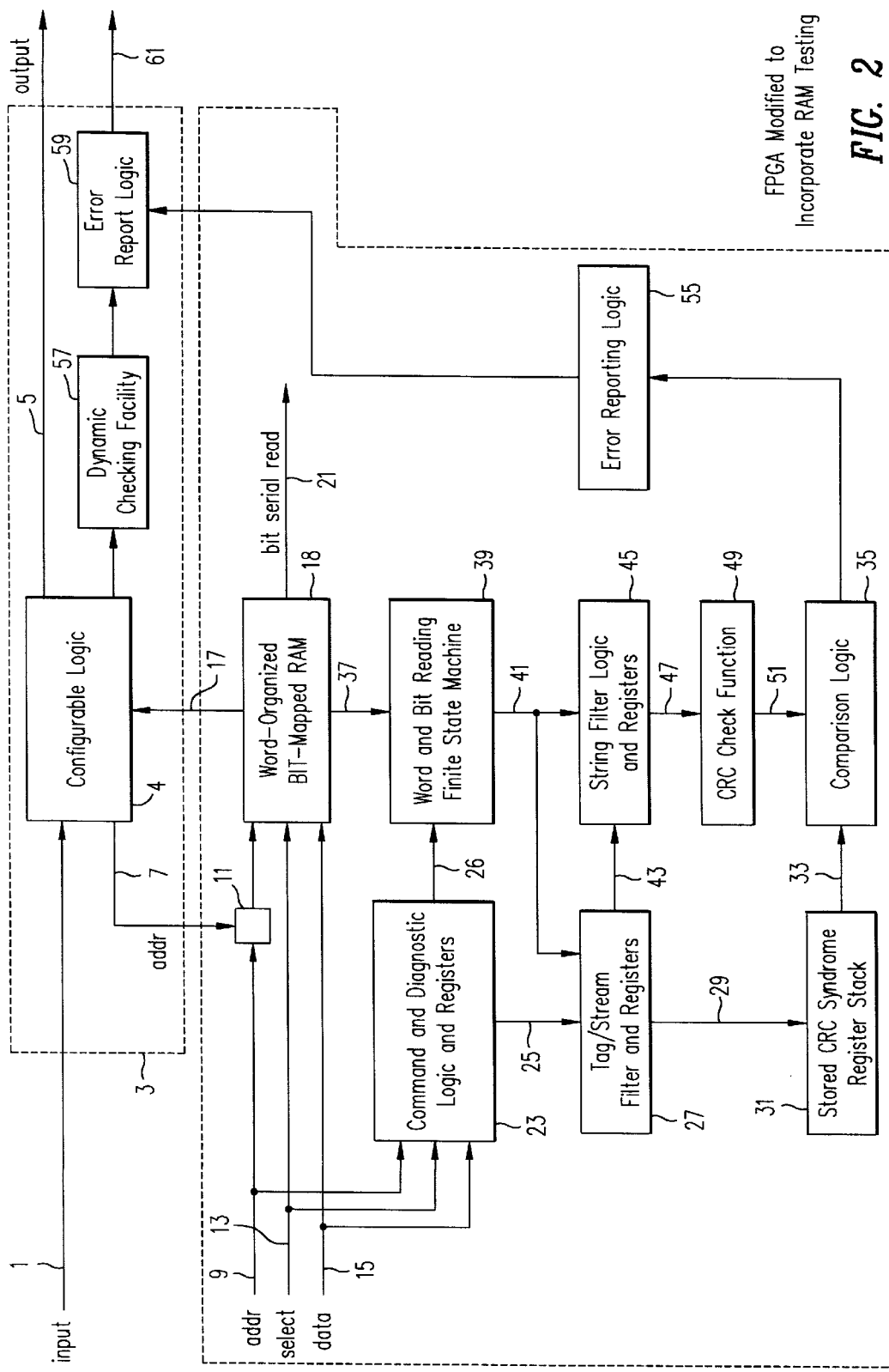

CRC Remainder Generated using a Polynomial of
Degree 6 and Register $G(X) = X^6 + X^5 + X^4 + X^3 + 1$ CRC Remainder Generated using a Polynomial of
Degree 32 and Register $P(X) = X^{32} + X^{23} + X^2 + X + 1$

METHOD AND APPARATUS FOR DETECTING AND CORRECTING ANOMALIES IN FIELD-PROGRAMMABLE GATE ARRAYS USING CRCS FOR ANOMALY DETECTION AND PARITY FOR ANOMALY CORRECTION

CROSS-REFERENCE TO RELATED APPLICATIONS

This application is a continuation-in-part of copending application Ser. No. 09/010,726 by Cheng et al., "Method and Apparatus for Performing On-chip Function Checks and Locating Detected Anomalies Within a Nested Time Interval Using CRCs or the Like", filed on Jan. 21, 1998.

FIELD OF THE INVENTION

This invention relates to field-programmable gate arrays (FPGAs) comprising a memory and a configurable logic chip. More particularly, the invention relates to detecting and correcting anomalies in the memory-stored directed graph representation of function, I/O, and routing and in anomalies occurring in its configurable logic chip image of the directed graph.

DESCRIPTION OF RELATED ART

It is well recognized in the world of application-specific integrated circuits that general purpose chips can be configured to perform a variety of digital processing functions. Programmable read-only memories (PROMs) were the first type of programmable chip-level device to achieve widespread use. The PROM is a one-time programmable device that consists of an array of read-only cells programmed to operate as logic circuits. In this regard, a logic circuit can be implemented by using the address lines of a PROM as the circuit's inputs. Relatedly, the circuit's outputs for any combination of active inputs are, in turn, defined by the stored bits and can implement any truth table function.

Traditionally, two versions of PROMs have been made available, namely, those programmed only by the manufacturer and those programmed only by the end user. The first type is termed "mask programmable", while the second type is termed "field programmable". The mask-programmable gate array (MPGA) provides superior speed performance because the chip and the array of logic function have connections within the device that are hard wired during manufacture. This requires volume production in order to recover increased fabrication costs.

In contrast, the field-programmable gate array (FPGA) comprises a two-dimensional array of configurable logic blocks that can be interconnected in a general way. It further comprises some form of memory-stored directed graph of the ultimate configuration, and a mechanism for connecting the blocks on the chip or array according to the graph. In this regard, the directed graph is mapped into a RAM memory or the like and then projected or fused onto the chip. While the FPGA is significantly slower in speed performance, nevertheless it permits reprogramming after installation. This further permits tailoring of performance to individual user needs and does not require standardization and production runs associated with the MPGA.

On a configurable chip, some FPGA logic blocks are as simple as NAND gates. Other blocks have more complex structures and include multiplexers and look-up tables. There exists a myriad of possibilities for defining the logic block as a more complex circuit, including several subcircuits having several inputs and more than one output. Fortunately, most logic blocks contained some type of flip-flop to aid in the implementation of sequential circuits. It should be appreciated that various generalized logic configurations involve a trade-off between function efficiency and the amount of chip area they occupy.

A configurable chip also includes a routing architecture. Typically, the routing architecture comprises both wire segments and programmable switches. The programmable switches include pass transistors controlled by static RAM cells, antifuses, and EPROM transistors among others. Relatedly, configuring the chip is also termed "programming" or "personalizing" and connotes the process by which the directed graph of logic function, input and output ports, and connections are mapped or imaged onto the chip. While each of the programming technologies (basically selectively connecting the routing architecture to different logical functions and ports) is quite different, they share the property of being configurable in one of two states, either "on" or "off". Lastly, the prior art has recognized that each programming or switching element should occupy very little chip area. Also, the element should have a low ON resistance and very high OFF resistance.

Of the programming technologies, static RAM cells (SRAM) and antifuses are very frequently used. Parenthetically, an FPGA combining both antifuse and static memory cell programming technologies is disclosed in Goetting, U.S. Pat. No. 5,744,979, "FPGA Having Logic Cells Configured by SRAM Memory Cells and Interconnect Configured by Antifuses", issued Apr. 28, 1998.

In SRAM, static RAM cells control a CMOS pass transistor. Alternatively, the SRAM could control both the n-channel and the p-channel transistors of a full transmission gate. In the case of a pass transistor, the SRAM cells control whether the pass gates are on or off. When off, the pass gate presents a very high resistance between the two wires to which it is attached. When the pass gate is turned on, it forms a relatively low resistance connection between the two wires.

In the antifuse technology, an antifuse normally resides in a high impedance state. However, it can be "fused" into a low impedance state when programmed by a high voltage. This procedure generates enough heat to cause a dielectric to melt and forms a conductive link between conductive elements. Advantageously, the chip required by an antifuse is very small compared to that of other programming technologies.

RAM-based FPGAs are popular implementation choices and, as previously mentioned, the FPGA comprises a set of logic gates on a chip and a "personalizing" map (more formally known as a directed graph) in a RAM. "Personalizing" or "programming" the configurable chip requires loading the RAM with indicia of the directed graph, such as a word-organized bit map of interconnection points. The bits are read out from the RAM and applied to the pass transistors or gates or to the antifuses on the chip. Their activation configures the chip.

In order to maintain reprogrammability, FPGA chips include significant redundancy among routing, logic finctions, and the programmable switches. This is manifest in the tightly packed and dense chip environments. The dense packing itself increases the likelihood of stray and induced signal cross-coupling and induction. Such unwanted signals corrupt information stored in the personalizing RAM and falsely set or reset switchable connections on the chip. This is in addition to any inherent faults or defect in the logical or routing expressed in the RAM information per se.

The art does teach several methods and means for testing and verifying on-chip logic. In this regard, copending application Ser. No. 09/010,726 by Cheng et al. is directed to static testing and verification of one or more functions on a chip. Cheng et al. by its terms does not cover RAM-based errors or the like. In Cheng, functions on the chip are tested by comparing ECC residues of function outputs with a signature of the clean or duplicate copy of the same function responsive to the same known data patterns.

SUMMARY OF THE INVENTION

It is accordingly an object of this invention to devise a nondestructive method and apparatus for detecting and correcting anomalies in an FPGA.

It is yet another object of this invention that such method and apparatus detect anomalies in FPGA connection information and to optionally utilize such to either detect anomalies in counterpart FPGA chip function or to correct the connection information and reconfigure counterpart FPGA chip function.

The foregoing objects are believed satisfied in an FPGA having a word-organized RAM memory for storing a directed graph of input, output, and logical functions; a configurable chip including logic functions, input and output ports, and connectable routers thereamong; and an arrangement for writing path connections through router alteration on the configurable chip as a physically realized image of the directed graph.

The method of the invention ascertains graph error and corrects the configurable chip on the FPGA. In its simplest form, the method relies upon calculating an ECC residue over a group of words extracted from the memory and comparing the residue with a previously stored or externally supplied signature residue. If the residue and the signature match, then either another group of words are evaluated or the test terminates. However, a mismatch results in taking at least one of several related actions. First, at least the chip and extrinsic notification of the occurrence of error can be given. This permits suspension or tagging of operations on the chip in process. Alternatively, error notification can be given and immediate verification testing of counterpart logic functions conducted. A third alternative is to error notify, correct the words in error, reprogram the logic chip with the corrected graph, and verification test the reprogrammed logic chip functions.

Correction of words of the graph can be accomplished in any one of several ways. In this invention, parity images are taken of groups of N words and stored in a failure-independent portion of the same or other memory, Any single word in error of an N word group is corrected by logically combining (modulo 2 addition) the parity image with N-1 of the error-free words. Also, syndrome processing of the ECC residues mismatching with their signatures could be undertaken.

The first salient feature is to identify error in the RAM-stored directed graph of the FPGA by comparing an ECC residue calculated over a group of words read from RAM with an ECC signature derived from a clean copy of the same word group. The second salient feature is the selection of remedial steps over a range of actions. This range includes (a) error notification, (b) error notification and chip verification testing, and (c) error notification, word correction, chip reprogramming, and verification testing.

To verify whether the rewritten or reprogrammed graph is imaged properly on the chip, a predetermined data pattern is applied to selected chip functions, and a second ECC residue is computed over the selected chip finction output. The second residue is then compared with a second signature residue. In this regard, the second signature residue was previously derived from an error-free copy of the same chip functions subject to the same data pattern and either locally stored or remotely supplied. In the event of a mismatch between the second ECC residue and second signature, error, erasure, or fault can be isolated in any nested sub-interval of time to a predetermined resolution by recursively repeating the verification steps over subsets of the same data pattern.

BRIEF DESCRIPTION OF THE DRAWING

FIG. 2 depicts a logic block modification of an SRAM FPGA according to the principles of the invention.

DESCRIPTION OF THE PREFERRED EMBODIMENT

Figure 1:
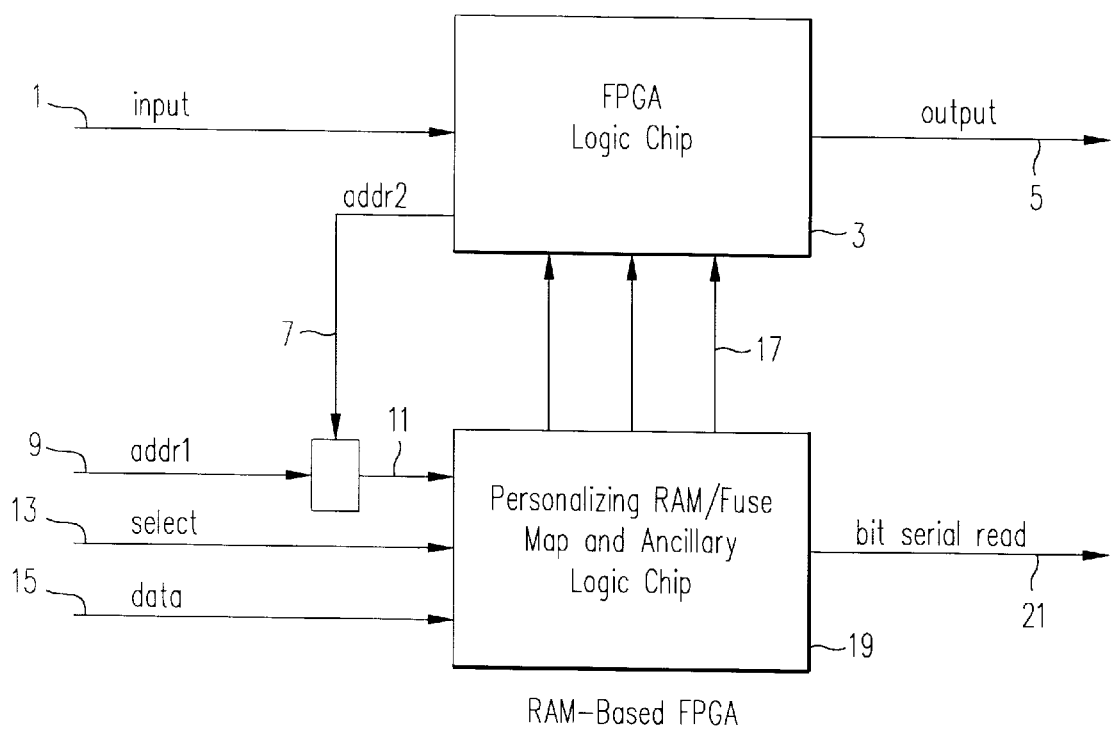
FIG. 1 illustrates the relations among the principal elements of a field-programmable gate array according to the prior art.

Referring now to FIG. 1, there is shown in a block diagram illustrating the coupling relationships among the principal elements of a field-programmable gate array according to the prior art. The FPGA comprises a logic chip 3 and an ancillary chip 19. The logic chip 3 comprises a two-dimensional array of logic blocks connected by general interconnection resources. As previously mentioned, interconnection resources include conductive paths and programmable switches. Logic circuits are implemented in the FPGA by partitioning the logic into individual logic blocks and then interconnecting the blocks as required by activating the switches. Along the edges of the array are arranged a plurality of input/output sales or ports. These define the signal, control, and data exit and entry ports to the two-dimensional logic block array.

The ancillary chip 19 includes a memory for storing a word-organized data bitmap identifying those switches which are to be closed and those switches which should be opened. Abstractly, such a map constitutes a directed graph defining the flow of control and data pathing between the FPGA input 1 and its signal output 5. The ancillary chip 19 further includes circuits and paths 9 and 13 responsive to access commands for writing information into the memory over data path 15, and reading information from the memory in either a word-organized fashion on path 17 or in a bit serial fashion on path 21. The FPGA also includes an arrangement for writing out or setting the programmable switches (not shown).

Initially, the information defining the personality of a chip (directed graph) is loaded into the memory on the ancillary logic chip 19. It is subsequently read out and used to "program" or set the switches on logic chip 3. Self-modification is provided in a limited degree by allowing circuits on the logic chip to provide an address modification over path 7 to the memory through gate 11.

In order to nondestructively test and locate any detected anomalies on logic chip 3 within a nested time interval, reference should be made to the copending Cheng et al. application. This application is hereby incorporated by reference.

Referring now to FIG. 2, there is shown a static RAM (SRAM) FPGA modified according to the principles of the invention. The modifications are directed to reading selected portions of the bitmap in RAM memory 18 by way of a finite state machine (FSM) 39, calculating an ECC residue over the selected bitmap portion in function circuit 49, comparing the residue and ECC signature in logic 35 and, in the event of a comparison match, either reading another portion of the bitmap and repeating the testing or terminating the process. In the event of a comparison mismatch, the logic 35 provides signal indication external to the chip logic 3 over a path including logic circuits 55 and 59. Further processing, such as correction of any bitmap portion in error and verification testing of the logic chip, will be discussed in connection with FIG. 4. However, such further processing is largely a matter of design choice as to whether it is to be performed on a microprocessor dedicated to the FPGA or at the device or application level.

Referring again to FIG. 2, attention is first directed to the RAM and ancillary logic chip 19. Access and selection commands and data are applied on paths 9, 13, and 15, respectively, to the word-organized bitmap random access memory (RAM) 18. The commands and data are concurrently applied to command and diagnostic logic circuits and registers 23. The command logic 23 accepts and stores commands from the access, selection, and data lines 9, 13, and 15. This unit in turn supplies control and synchronism to other units, such as finite state machine 39 over path 26 and the tag-constrained filter in registers 27 over path 25.

The finite state machine (FSM) 39 is coupled to the bitmap RAM 18 and reads the map either on a word at a time or on a bit serial basis. In this regard, the word or words to be read are specified in a register in command unit 23. The FSM preferably is fashioned from a microprocessor with suitable control codes to start from a first memory address and extract successive words until a specified range has been exhausted. Unfortunately, certain commercial FPGAs intersperse extraneous information in their bitmaps. The string filter and register 27 are designed to eliminate such information and enable the string filter logic 45 over path 43 through parsing and filtering. That is, string filter 45 is configured by tag filter 27 and takes out the tags and contents of unrelated tags otherwise embedded in the words of bitmaps after they have been extracted by the FSM 39 from RAM 18.

It should be appreciated that a directed graph is a computer science construct representing circuit functions and connections as nodes and links. Such nodes and links may be articulated in the form of multidimensional arrays, such as bit-mapped strings of 1's and 0's. In such a bitmap, a "1" might designate a pass transistor on the logic chip set to a low impedance state and its location coupling thereby two conductors. Alternatively, a "1" might designate a low impedance fuse state, etc. Similarly, a "0" might designate a high impedance state for a pass transistor ensuring no conductive coupling between electrical data or control paths otherwise converging on that location.

If RAM 18 is word organized, then data is either written into the memory or read from the memory a word at a time. If it were desirable to electronically cut and paste bit strings of more or less than the word length, multiple reads and write masking techniques can be used. Reference may be made to Eiselen, U.S. Pat. No. 3,976,982, "Apparatus for Image Manipulation", issued Aug. 24, 1976, for a description of a variable-length accessible bitmap RAM. Significantly, Eiselen discusses the electronic cut and paste of arbitrarily small subarrays, especially their reinsertion into RAM.

After each word is extracted by FSM 39 from a RAM 18 and "cleaned" by string filter 45, it becomes the subject of an ECC fuction check. More particularly, the word is applied to a CRC function checks generator 49 and a residue or remainder calculated therefrom. This ECC/CRC residue is then applied as one input to comparison logic 35. The other input is derived from a previously-stored ECC/CRC residue signature calculated over a known uncorrupted copy of the same word or word group. It is expected that words or word groups would be read by the FSM 39 of RAM 18 in a predetermined, usually sequential, order. Likewise, the ECC/CRC signatures are communicated to ancillary chip 19 through a path including data path 15, command logic 23, and tag filter 27. The signatures are stored in the same predetermined, usually sequential, order in CRC register stack 31. As each CRC residue is calculated in circuit 49 and applied to comparison logic 35, a counterpart signature is applied from stack 31 as a second input over path 33 to comparison logic 35.

Figure 3A:
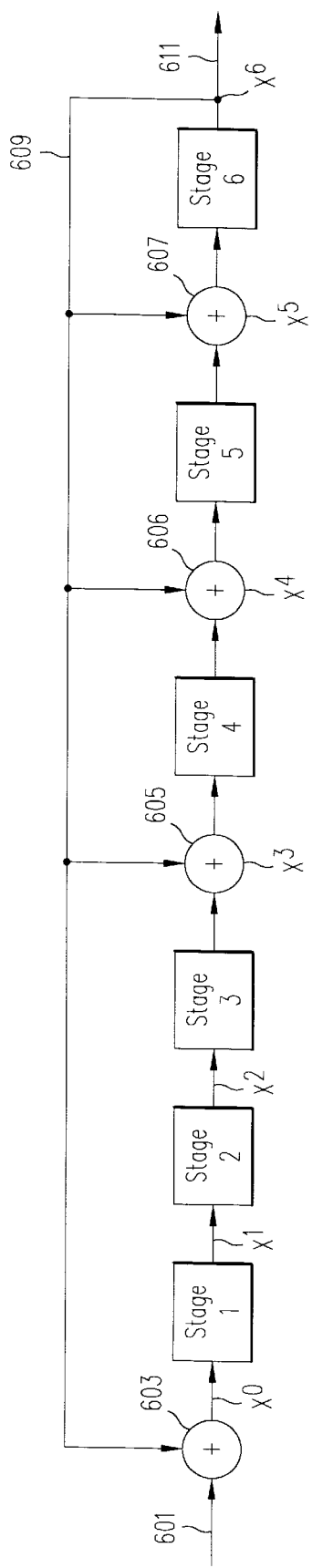
FIGS. 3A and 3B illustrate respectively a CRC remainder generated using a polynomial and register of degree 6 and a CRC remainder generated using a polynomial of degree 32.

Referring now to FIG. 3A, there is shown a feedback shift register of the type embodied in CRC check logic 49 for generating cyclic redundancy check (CRC) bits. CRC encoding operates on an n-bit pattern or block of data as a unit. It mathematically treats a string of data as if it were a polynomial in a Galois field. The encoding is obtained by inviting the data polynomial by a code generator polynomial also in a Galois field and utilizing as the remainder the code check bits. It is known that a well-constructed CRC polynomial will detect any contiguous burst of errors shorter than the polynomial, any odd number of errors throughout the word or group of words, and any two-bit errors anywhere within the word or group of words. The division of polynomials of a Galois field $\{2^m\}$ is implemented in module 2 arithmetic in a register of a length corresponding to the remainder produced by the generating polynomial.

The register shown in FIG. 3A implements the generating polynomial $g(x)=(x^6+x^5+x^4+x^3+1)$. The register comprises six shift stages counterpart to the degree 6 of the CRC generating polynomial. Prior to use, the register is first cleared, then data is shifted into the register at port 601 and shifted to the right. Each shift is a form of polynomial multiplication. Each shift also shifts a bit out of the register at port 611. The output bit is also fed back on path 609 and exclusively OR'd at XOR gates 603, 605, 606, and 607. Algorithmically, the register division operation to secure the remainder can be represented in pseudo-code in the form of a While loop:

```
WHILE {data bit exists}
    SHIFT registers 1 bit right;
    READ next data bit into shift position 0 at input;
    IF a binary 1 present at output 611 and feedback path 609
        THEN Register := Register XOR Polynomial
END
```

The register should now contain the desired CRC remainder or check bits.

Figure 3B:
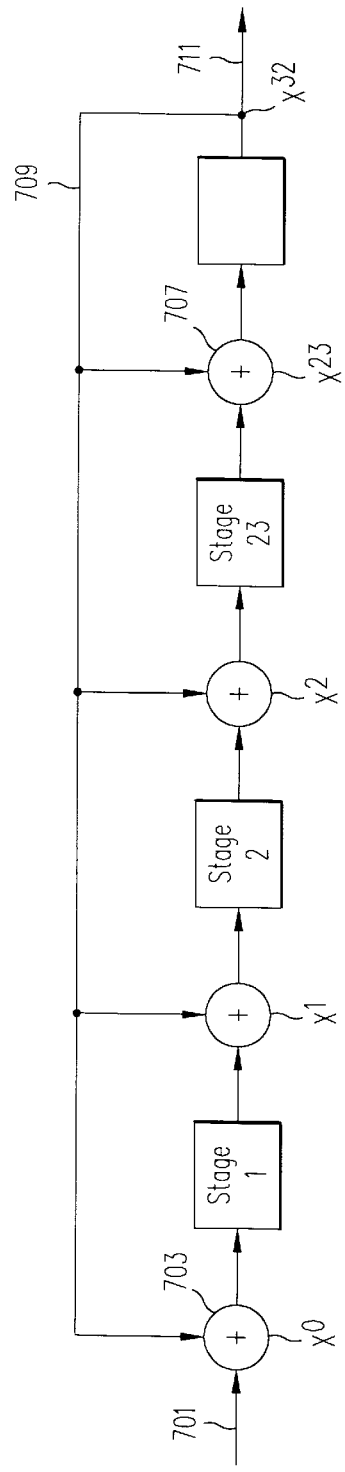

Referring now to FIG. 3B, there is shown a CRC shift register arrangement suitable for use with the preferred embodiment of the invention. Assuming for illustrative purposes that the n=32 bit data patterns are applied to the function, then for degree 32 a CRC generating polynomial with desirable characteristics would be $$P(x)=x^{32}+x^{23}+x^2+x+1.$$

In FIG. 3B, the register is first cleared (set to all 0's) and then a 32-bit data pattern is serially shifted in at port 703. Whenever an output binary 1 on port 711 is fed back to the input port XOR gate 703 over path 709, the new data bit is XOR'd with the fed back value and shifted into stage 1. This process is repeated until all n≧32 bits have been entered into the register in this manner. At that point, the contents of the register constitute the CRC remainder and can be shifted out.

The comparison logic 35 can range from a simple AND gate to a sophisticated subtractor. The primary purpose served by the logic 35 is to provide signal indication of an erasure, error, or fault solely as a function of a comparison mismatch or relative magnitude difference between this CRC residue calculated over the word or word group extracted from RAM 18 by FSM 39 and the precalculated and stored CRC residue or signature over an uncorrupted copy of the same word or word group. Error indication is then sent to a local error reporting logic 55 on the auxiliary chip 19 and to a counterpart error logic 59 on the logic function chip 3.

Actually, any linear error correction block code of the CRC, Reed-Solomon, or BCH type could be used. All of the codes use generator polynomials and result in residues or remainders upon division of a data bit string. All the codes would permit recursive isolation of any nested subinterval to a predetermined resolution by recursively repeating the comparison steps over subsets of the same data patterns. A more detailed description of such resolution is disclosed in the incorporated copending Cheng et al. application.

At this point, there are several options with respect to subsequent processing of the FPGA. The first option is that of error reporting. The second option is to conduct a verification test on the logic functions counterpart to the RAM of a word or word group in error. The third option is to correct the word error, reprogram all or some of the logic chip functions using the corrected map, and verification test the programmed logic chip functions.

Figure 4:
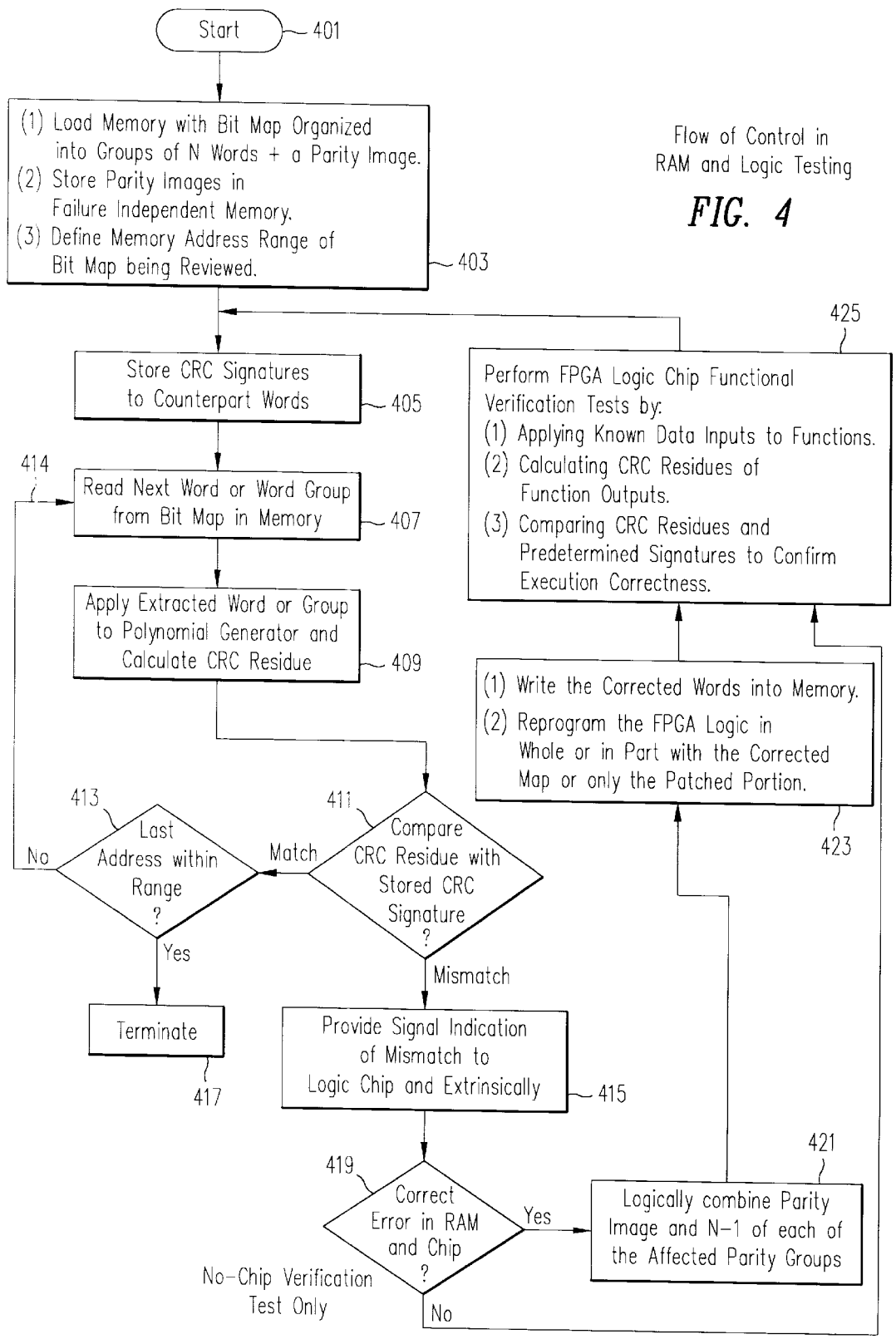
FIG. 4 shows a flow of control for testing the RAM storage bitmap of the FPGA and, upon mismatch between calculated CRC residues and signatures, optionally selects one of several processing options.

Referring now to FIG. 4, there is shown a flow of control for testing the RAM storage bitmap of the FPGA and, upon mismatch between calculated CRC residues and signatures, optionally selects one of several processing options. The process is invoked in step 401, at which time a bitmap representing a directed graph of the logic functions on chip 3 is read into a RAM memory 13. At this point, step 403 defines a series of parity images over counterpart words or groups of words. The parity images are then stored in a failure-independent part of the same or other memory. This form of reconstruction or replacement of a failed word in memory by logically combining (by modulo 2 addition) a parity image with N-1 other words of the same parity group is well described in Ouchi, U.S. Pat. No. 4,092,732, "System for Recovering Data Stored in Failed Memory Unit", issued May 30, 1978; and Clark et al., U.S. Pat. No. 4,761,785, "Parity Spreading to Enhance Storage Access", issued Aug. 2, 1988.

The purpose of creating parity groups is to enable restoration of at least one number of the group in the event of error or erasure or fault. Arguably, a mismatch between stored and calculated residues indicates the existence of error within the word or word group. By logically combining a parity image and N-1 of the remaining words or words of the group, then the word in error can be reconstituted.

Returning now to step 403, the initialization is completed by defining the memory address range of the bitmap subject to being reviewed. Next, the CRC signatures of the counterpart words are stored in the CRC syndrome register stack 31 in step 405. Control next passes to the FSM in step 407 where the next words or word group from the bitmap memory 18 is read out and applied to CRC polynomial generator in logic element 49. In step 409, a remainder is calculated in logic element 49 by dividing the extracted word by the generator polynomial.

The CRC residue at the output of circuit 49 is compared with the stored CRC signature for the same uncorrupted words or word group in step 411. If the residue and signature match, control is passed to step 413. This step merely ascertains whether the matching residue belongs to the last address within the range under review. If it is, then the process terminates in step 417. If it is not the last address, the control passes to step 407 where the next word or word group is extracted from the bitmap and memory and the process in steps 409 and 411 is repeated.

Where the residue and signature mismatch in step 411, signal indication of the mismatch is provided extrinsically to the logic chip in step 415. If the test is of the type to merely ascertain whether the counterpart chip function is likewise faulty, then the method provides in step 419 the transfer of control to step 425, which deals with chip function verification testing. However, if the test is of the type in which the words in error are to be corrected, the logic chip reprogrammed with the corrected bitmap, and reprogrammed chip verification tested, then control transfers to steps 421, 423, and 425.

Step 421 involves accessing the failure-independent memory to obtain the parity image and logically combining the image with the remaining words of the parity group. The modulo 2 addition of the image and N-1 words of an N word group should reconstitute the word in error. In step 423, the corrected word or words are then written back into memory 18 by FSM 39. At this point, the logic chip can be reprogrammed by rewriting the affected configurable logic 4 on chip 3 through resetting of appropriate pass transistors or the like.

Control now passes to step 425. This step executes the verification tests on the cognizable chip functions. The simplest implementation is that of applying a known input data pattern to a function, calculating a CRC residue over the function output, and comparing the residue with a CRC signature residue ascertained over a clean copy of the function with the same data input pattern.

As may be recalled, when one or more words of the directed graph are found to be in error by mismatch between their CRC residue and a counterpart signature derived from a clean copy, one alternative step is to provide notification to the chip function and especially to any controller on the chip. Responsive to the error notice, the chip function or controller can abort any operation in process, transferring its operating state into a failure mode gracefully. Additionally, a chip controller or function can be involved in additional testing for error isolation for purposes of isolating faulty chip function (called "fencing"), and then continue chip operation in a reduced capability mode. In the event that the verification test signifies chip function in error and recursive processing isolates the error occurrence, use can be made of that fact to modify the graph RAM words. However, such interactivity and self-repair adds significant complexity.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. A method for detecting and correcting anomalies in a field-programmable gate array (FPGA), said FPGA having a memory for storing a word-organized directed graph of networked logic functions; a configurable chip including logic functions, paths, and connection elements; and an arrangement coupling the memory and the chip for programming the connection elements to constitute a physically realizable image of the directed graph, the method comprising the steps of:

(a) forming parity images of groups of words of the graph in the memory and storing said parity images in a failure-independent part of the same or other memory;

(b) accessing a set of words from the memory, calculating an ECC residue, and comparing the ECC residue with an ECC signature previously derived from an error-free copy of the same set of words;

(c) in the event of a comparison match, either repeating steps (b)–(d) over another set of words or terminating the test; and (d) in the event of a comparison mismatch, invoking a step selected from a set of steps consisting of (1) notification only of error, (2) error notification and immediate verification testing of counterpart logic chip functions, and (3) error notification, parity image correction of the words in error, reprogramming of the chip functions utilizing the corrected graph, and verification testing of the counterpart logic chip functions.

2. In a field-programmable gate array (FPGA) having a word-organized memory for storing indicia of a directed graph of input, output, and logical functions; a configurable chip including logic functions, input and output ports, and connectable routers thereamong; and an arrangement for writing path connections on the configurable chip as a physically realized image of the directed graph, a method for ascertaining graph error and correcting the configurable chip on said FPGA comprising the steps of:

(a) forming parity images of counterpart groups of N words of indicia and storing said parity images in a failure-independent portion of the same or other memory;

(b) reading selected indicia from the memory, computing a first linear block error correction code (ECC) residue over the indicia, and comparing the first residue with a first signature ECC residue, said first signature residue being previously derived from an error-free copy of the selected indicia;

(c) in the event of a comparison match between the first ECC residue and the first signature, either repeating step (b) with respect to other selected indicia from the memory or terminating the test; and (d) in the event of a comparison mismatch between the first ECC residue and the first signature, correcting said graph in memory including said selected indicia utilizing the parity images, and rewriting at least the corrected selected indicia associated with the mismatch on the configurable chip.

3. The method according to claim 2, wherein step (d) further comprises the steps of:

(d1) logically combining the parity image with N-1 error-free words of an N word identified parity group or groups; and (d2) applying the logically combined indicia to the chip and causing the chip to be reconfigured accordingly.

4. The method according to claim 2, wherein the method further comprises the steps subsequent to rewriting the chip of:

(e) applying a predetermined data pattern to selected ones of the chip functions inclusive of the path connections physically realized from the rewritten indicia, and computing a second ECC residue over the selected function output;

(f) comparing the second residue with a second signature residue, said second signature residue being derived from an error-free copy of the same chip functions subject to the same data pattern; and (g) in the event of a mismatch between the second residue and second signature in step (f), isolating any nested subinterval of time to a predetermined resolution within which an error, erasure, or fault would occur by recursively repeating steps (e)–(g) over subsets of the same data pattern.

5. The method according to claim 2, wherein the linear block error detection code in ascertaining and comparing residues and signatures is one selected from a set consisting of a cyclic redundancy check (CRC) code, a Reed-Solomon code, and a BCH code.

6. In a field-programmable gate array (FPGA) having a memory for storing indicia of a directed graph of input, output, and logical functions; a configurable chip including logic functions, input and output ports, and connectable routers thereamong; and an arrangement for writing path connections on the configurable chip as a physically realized image of the directed graph, a method for performing function checks and isolating detected anomalies within a nested time interval on said FPGA comprising the steps of:

(a) reading selected indicia from the memory, computing a first linear block error correction code (ECC) residue over the indicia, and comparing the first residue with a first signature ECC residue, said first residue previously derived from an error-free copy of the indicia;

(b) in the event of a comparison match between the first ECC residue and the first signature, either repeating step (a) with respect to other selected indicia or terminating the test;

(c) in the event of a comparison mismatch between the first ECC residue and the first signature, ascertaining function on said chip operative as an image counterpart to the selected indicia of the graph, applying a predetermined data pattern to the ascertained function, computing a second ECC residue over the ascertained function output, and comparing the second ECC residue with a second signature ECC residue, said second signature residue being derived from the output of an error-free copy of the ascertained function subject to the same data pattern; and (d) responsive to a comparison mismatch between the second residue and second signature in step (c), isolating any nested subinterval of time to a predetermined resolution within which an error, erasure, or fault would occur by recursively repeating steps (c)–(d) over subsets of the same data pattern.

7. The method according to claim 6, wherein the linear block error detection code in ascertaining and comparing residues and signatures is one selected from a set consisting of a cyclic redundancy check (CRC) code, a Reed-Solomon code, and a BCH code.

8. The method according to claim 6, wherein the memory-stored indicia are word organized, the method further comprising the steps of:

(e) forming parity images of counterpart groups of N words of indicia and storing said parity images in a failure-independent portion of the same or other memory; and (f) in the event of a comparison mismatch between the first residue and the first signature, logically combining the parity image with N-1 error-free words of an N word identified parity group or groups, applying the logically combined indicia to the chip, and causing the chip to be reconfigured accordingly.

9. The method according to claim 8, wherein the polynomial for CRC determination is one selected from the set expressed in Galois field arithmetic consisting of $(x^{16}+x^{12}+x^5+1)$ and $(x^{32}+x^{26}+x^{23}+x^{22}+x^{16}+x^{12}+x^{11}+x^{10}+x^8+x^7+x^5+x^4+x^2+1)$.

10. The method according to claim 8, wherein the nested subinterval size and predetermined resolution is determined by the degree of the highest term in the CRC polynomial, and further wherein the recursively repeating steps (c)–(d) constitute a recursive binary search to locate the error, erasure, or fault within the nested subinterval of predetermined resolution.

11. In a field-programmable gate array (FPGA) having a memory for storing indicia of a directed graph of input, output, and logical functions; a configurable chip including logic functions, input and output ports, and connectable routers thereamong; and an arrangement for writing path connections on the configurable chip as a physically realized image of the directed graph, a method for performing function checks and isolating detected anomalies within a nested time interval on said FPGA, comprising the steps of:

(a) reading selected indicia from the memory, computing a first cyclic redundancy code (CRC) residue over the indicia, and comparing the first residue with a first signature CRC residue previously derived from an error-free copy of the indicia;

(b) in the event of a comparison match between the first CRC residue and the first CRC signature, either repeating step (a) with respect to other selected indicia or terminating the test;

(c) in the event of a comparison mismatch between the first CRC residue and the first CRC signature,
  (1) ascertaining such function on said chip operative as an image counterpart to the selected indicia of the graph,
  (2) applying a predetermined data pattern to the ascertained function,
  (3) computing a second CRC residue over the ascertained function output, and
  (4) comparing the second CRC residue with a second signature CRC residue, said second signature CRC residue being derived from the output of an error-free copy of the same functions subject to the same data pattern; and (d) responsive to a comparison mismatch between the second residue and second signature in step (c), isolating any nested subinterval of time to a predetermined resolution within which an error, erasure, or fault would occur by recursively repeating steps (c)–(d) over subsets of the same data pattern.

12. A field-programmable gate array (FPGA) comprising:

a memory for storing word-organized indicia of a directed graph of input, output, and logical functions and for storing linear block error correction code (ECC) signature residues over counterpart ones of the indicia previously derived from an error-free copy of counterpart ones of the indicia;

a configurable chip including logic functions, input and output ports, and connectable routers thereamong;

an arrangement for programming (writing) path connections on the configurable chip, said path connections being a physically realized image of the directed graph; and a logic arrangement including a finite state machine (FSM) for reading selected indicia from the memory, for computing a first ECC residue over the selected indicia, for comparing the first ECC residue with the memory-stored counterpart signature residue, and
  (1) responsive to a comparison match for either selecting other indicia for processing or terminating the test, and
  (2) responsive to a comparison mismatch for selecting a remedial response from a set consisting of (a) providing signal indication to said writing arrangement and chip to isolate or suspend such functions on said chip operative as an image counterpart to the selected indicia of the graph; (b) providing said signal indication and for performing verification testing on said counterpart functions; or (c) providing signal indication, correcting said words in error, reprogramming said chip with the corrected words of the graph, and verification testing of the reprogrammed chip.

13. An article of manufacture comprising a machine-readable memory having stored therein a plurality of processor-executable control program steps for ascertaining graph error in indicia of a directed graph of input, output, and logical functions normally stored in the memory portion of a field-programmable gate array (FPGA) and for correcting a configurable chip on said FPGA including logic functions, input and output ports, and connectable routers thereamong, the FPGA further including the arrangement for writing path connections on the configurable chip as a physically realized image of the directed graph, said control program steps include:

(a) a control program step for forming parity images of counterpart groups of N words of indicia and for storing said parity images in a failure-independent portion of this angle or other memory;

(b) a control program step for reading selected indicia from the memory, for computing a first linear block error correction code (ECC) residue over the indicia, and for comparing the first residue with a first signature of ECC residue, said first signature residue being previously derived from an error-free copy of the selected indicia;

(c) a control program step operative in the event of a comparison match between the first ECC residue and the first signature for either repeating execution of the control program step (b) or for terminating the test; and (d) a control program step operative in the event of a comparison mismatch between the first ECC residue and the first signature for correcting the graph in memory including the selected indicia utilizing the parity images, and writing at least the corrected selected indicia associated with the mismatch on the configurable chip.

* * * * *